C. M. PINCKNEY.
WATER DISTRIBUTER.
APPLICATION FILED NOV. 14, 1913.

1,127,508.

Patented Feb. 9, 1915.

3 SHEETS—SHEET 3.

UNITED STATES PATENT OFFICE.

CHAUNCEY M. PINCKNEY, OF BOULDER, COLORADO.

WATER-DISTRIBUTER.

1,127,508.      Specification of Letters Patent.      Patented Feb. 9, 1915.

Application filed November 14, 1913. Serial No. 801,036.

*To all whom it may concern:*

Be it known that I, CHAUNCEY M. PINCKNEY, a citizen of the United States, residing at Boulder, in the county of Boulder and State of Colorado, have invented certain new and useful Improvements in Water-Distributers, of which the following is a specification.

This invention relates to a system of irrigation, and the principal object of the invention is to provide an irrigating device which will cause the water to fall upon the ground after the manner in which rain falls upon the ground. That is to say, the water flows from a pipe in relatively small streams and falls upon the ground.

Another object of the invention is to provide an irrigating device in which there is provided a discharge pipe which is supported by a novel form of supporting means so that the pipe can be angularly adjusted.

Another object of the invention is to so construct the supports for the pipe that the irrigating device may be vertically adjusted for use in fields of growing crops, and to so construct the support that the irrigating device may be easily conveyed from one part of the field to another.

Another object of the invention is to so construct the supports that the outer ends of the pipe may be turned to prevent the irrigating device from moving out of a desired position in the field and thus permit the irrigating device to be used upon hilly ground.

Another object of the invention is to so construct the irrigating device that a relatively short discharge pipe may be used in connection with one support if desired.

This invention is illustrated in the accompanying drawings wherein—

Figure 1:
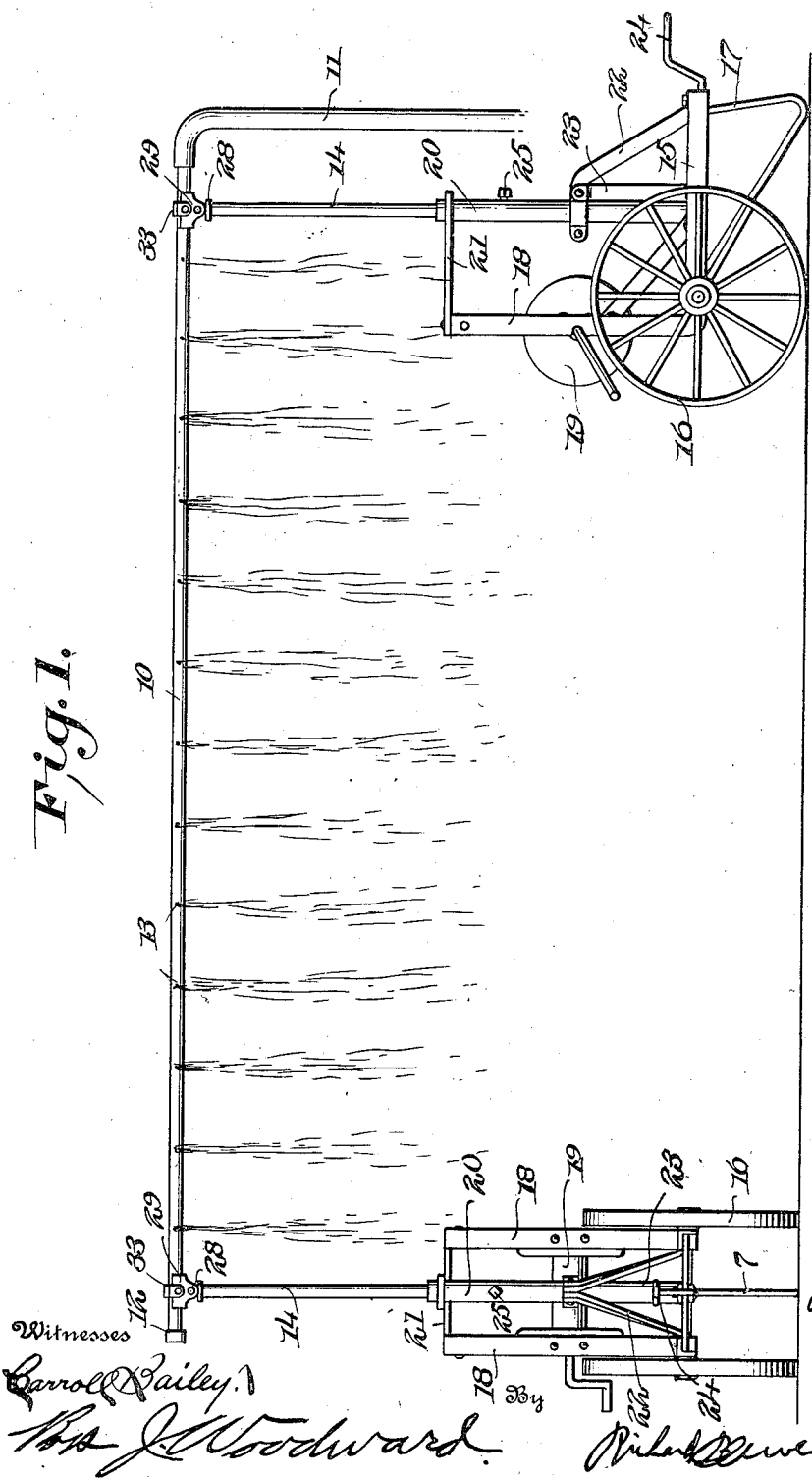
Figure 2:
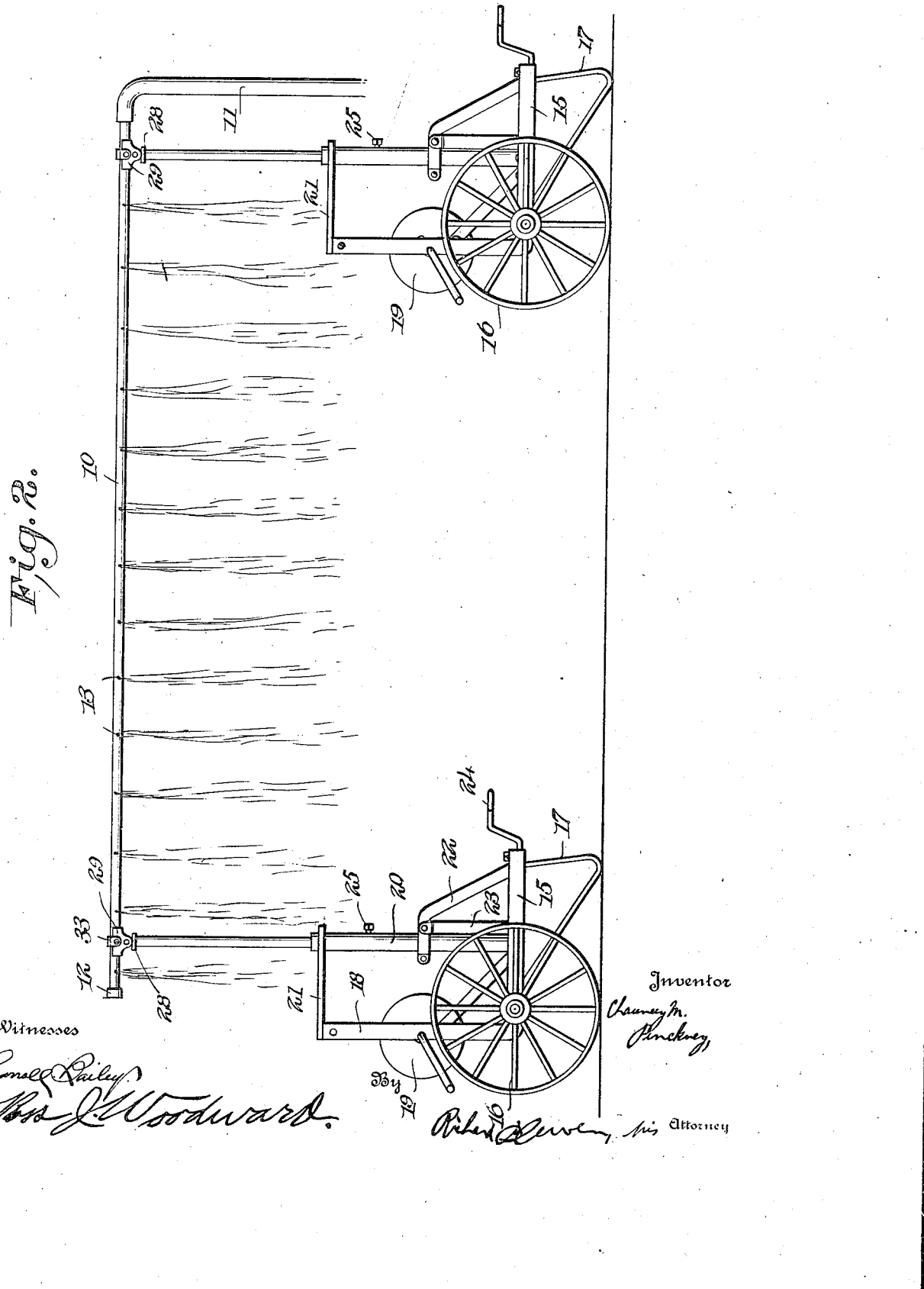
Figure 3:
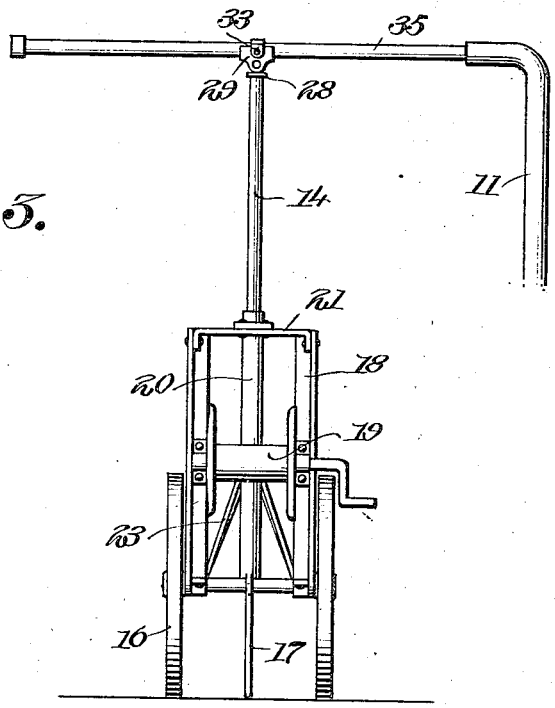
Figure 4:
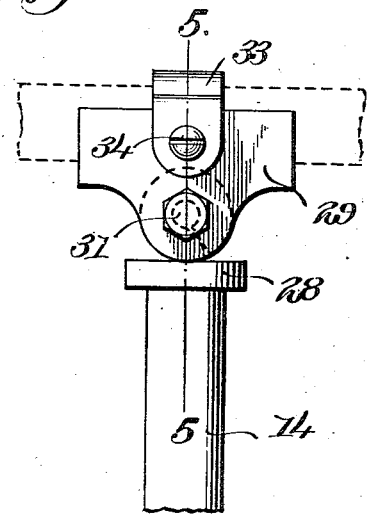
Figure 5:
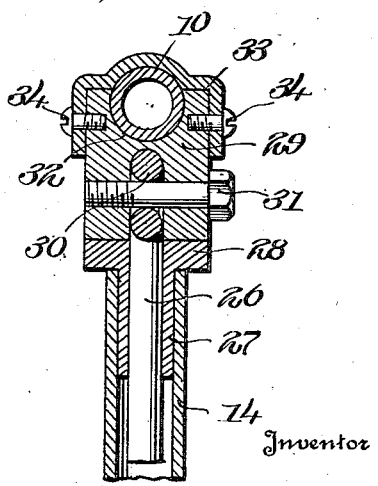

Figure 1 is a view showing the irrigating device with the support at one end turned at an angle to the support at the opposite end of the pipe; Fig. 2 is a view similar to Fig. 1 with the supports both facing in the same direction; Fig. 3 is a view showing a relatively short discharge pipe carried by a single support; Fig. 4 is an enlarged elevation of the upper end of the standard carried by one of the carriages; Fig. 5 is a vertical sectional view taken along the line 5—5 of Fig. 4.

The irrigating device shown in Figs. 1 and 2 comprises a discharge pipe 10 which is open at one end for connection with a supply hose and provided at the opposite end with a closure cap 12. This pipe is provided with openings 13 so that small streams of water may pass out of the discharge pipe, the openings being arranged according to the desires of the person manufacturing the irrigator. That is to say, the openings may be formed to throw the streams of water in any direction desired. The water which passes through the hose 11 into the discharge pipe 10 is preferably supplied by a suitable force pump so that the water will have sufficient force to be thrown from the pipe 10 the desired distance. This pipe 10 is supported by standards 14 which form part of the carriages shown, and since the carriages and standards are similarly constructed, a description of one will suffice for both. Each of these carriages comprises a frame 15 which is supported by wheels 16, and is provided with a leg 17 which rests upon the ground as shown in the drawings. The side bars of the frame have their end portions 18 carried upwardly to form supports for the drum 19, upon which the hose 11 is wound when the irrigating device is not in use, and the upper ends of the supports 18 are connected with the vertical housing 20 by means of the bracing arms 21. This housing 20 is supported by the braces 22 which are carried by the frame and have their upper-end portions held in the desired position by the vertical bars 23. A handle 24 is provided so that a carriage may be easily drawn from one place to another.

The standard 14 is slidably mounted in the housing 20 and is held in a vertically adjusted position by means of the set screw 25 which is carried by the housing. An eye pin 26 is rotatably mounted in the bushing 27 which is supported in the upper end of the standard by means of its head 28 and the support shoe 29 is pivotally connected with the eye 30 of the pin 26 by means of the bolt 31. This shoe 29 is provided with a groove 32 which forms a seat for the discharge pipe 10, the pipe being held in the seat by means of a clamp collar 33 which has its arms removably connected with the shoe by means of the machine screws 34. It will thus be seen that the standards of the two carriages may be vertically adjusted at different heights so that the pipe 10 will be held at any angle desired. If the two standards are at the same height, the shoe will be held in the position shown in Fig. 2, but if one of the standards is at a different height then the other shoe will be tilted to permit the pipe to assume the desired angle without moving out of engagement with the grooves 32 of the two shoes.

If it is desired to use a shorter length of pipe such as shown in Fig. 3, the short discharge pipe 35 is connected with the supporting shoe of one of the standards at about the center of the pipe and may be braced by suitable braces connecting the end portions of the pipe with the carriage so that the pipe will be held in the desired position. In both forms the carriage construction is the same, the only difference being that instead of a relatively long pipe being used and supported by two carriages, there is used a relatively short pipe which is supported by a single carriage.

In the operation of this device, the irrigating device is conveyed to the field or lawn which it is desired to water and the standards are then adjusted to the proper height so that the pipe 10 will not interfere with growing crops. If this is being used on a lawn, the standards do not have to be adjusted unless it is desired to raise the discharge pipe so that the water will be thrown a greater distance and not strike the lawn with sufficient force to injure the grass. If, however, it is desired to use this device in a corn field, it is necessary to raise the pipe a sufficient distance from the ground so that the irrigating device can be moved from one end of the field to the other without the pipe striking the tops of the corn. When the device is being used, it is gradually moved from one end of the field to the other, it being allowed to remain in one spot a sufficient time to deposit the desired amount of water upon that portion of the field. In order to prevent the irrigating device from moving out of the set position, one of the carriages is turned so that its wheels extend at an angle to the wheels of the second carriage and this prevents any movement of the device. This machine can be used for watering a road as well as for sprinkling a lawn and irrigating fields.

When it is desired to water a limited amount of space, the shorter length of pipe would be used in preference to the long pipe. When it is no longer desired to use the device, the pipe can be detached from the carriages and the machine can then be put away and will take up a very small amount of space.

What is claimed is:

1. In a device of the character described, a support, a standard carried by said support, a shoe rotatably and pivotally connected with said standard and provided with a groove forming a pipe seat, a clamp extending across said groove and having its arms extending along the sides of said shoe, and means extending through the arms of said clamp for removably connecting said clamp with said shoe.

2. In a device of the character described, a carriage comprising a frame having its side bars bent upwardly to form supports, a reel carried by said supports, a housing carried by said carriage, means connecting said housing with the upper ends of said supports to hold said housing and supports in a vertical position, bracing means carried by said frame and engaging said housing at the point intermediate its height, a standard supported in said housing, means carried by said standard for engaging a discharge element and supporting means for said frame.

3. In a device of the character described a carriage comprising a frame including upwardly extending bars forming supports, a reel carried by said supports, a housing carried by said carriage, means connecting said housing with said supports to hold said supports in a vertical position, bracing means engaging said housing, a standard supported in said housing, and means carried by said standard for engaging a discharge element.

In testimony whereof I affix my signature in presence of two witnesses.

CHAUNCEY M. PINCKNEY.

Witnesses:
  WARREN ROSE DAVENPORT,
  RUTH B. RICHARDSON.